Aug. 27, 1957  A. A. ASHTON  2,803,973
ROTARY MACHINE DRIVE FOR WELL SERVICING MACHINES
Filed March 16, 1953  2 Sheets-Sheet 1

INVENTOR.
ALBERT A. ASHTON,
BY
ATTORNEY

United States Patent Office 2,803,973
Patented Aug. 27, 1957

2,803,973

ROTARY MACHINE DRIVE FOR WELL SERVICING MACHINES

Albert A. Ashton, Houston, Tex., assignor, by mesne assignments, to Youngstown Sheet and Tube Company Application March 16, 1953, Serial No. 342,681

9 Claims. (Cl. 74—665)

My invention relates in general to equipment for drilling and servicing wells and relates in particular to a well servicing drawworks arranged for selective connection thereto of a self-contained rotary machine drive unit, making it possible to employ the drawworks for rotary well drilling operations when desired.

It is an object of the invention to provide a drawworks having at the forward part thereof a shaft which supports a cable spool, there being a sprocket on one end of the shaft equipped so that a selectively operable rotary machine drive unit may be attached thereto, thereby converting the drawworks into a drawworks capable of well drilling operations involving the use of a rotary machine, and providing means whereby the rotary machine may be driven through a power connection with the drawworks.

It is a further object of the invention to provide a simple, selectively operable rotary machine drive unit which may be attached to a selected driven shaft.

A further object of the invention is to provide a rotary machine drive unit of novel and compact form including clutch means adapted to be independently controlled, thereby making it possible to drive the rotary machine from a driven shaft of the drawworks.

Further objects and advantages of the invention may be brought out in the following specification wherein I have described details of a preferred embodiment of the invention for the purpose of enabling those skilled in the art to readily practice the invention, without limiting the scope thereof defined by the appended claims.

Referring to the drawings which are for illustrative purposes only:

Figure 1:
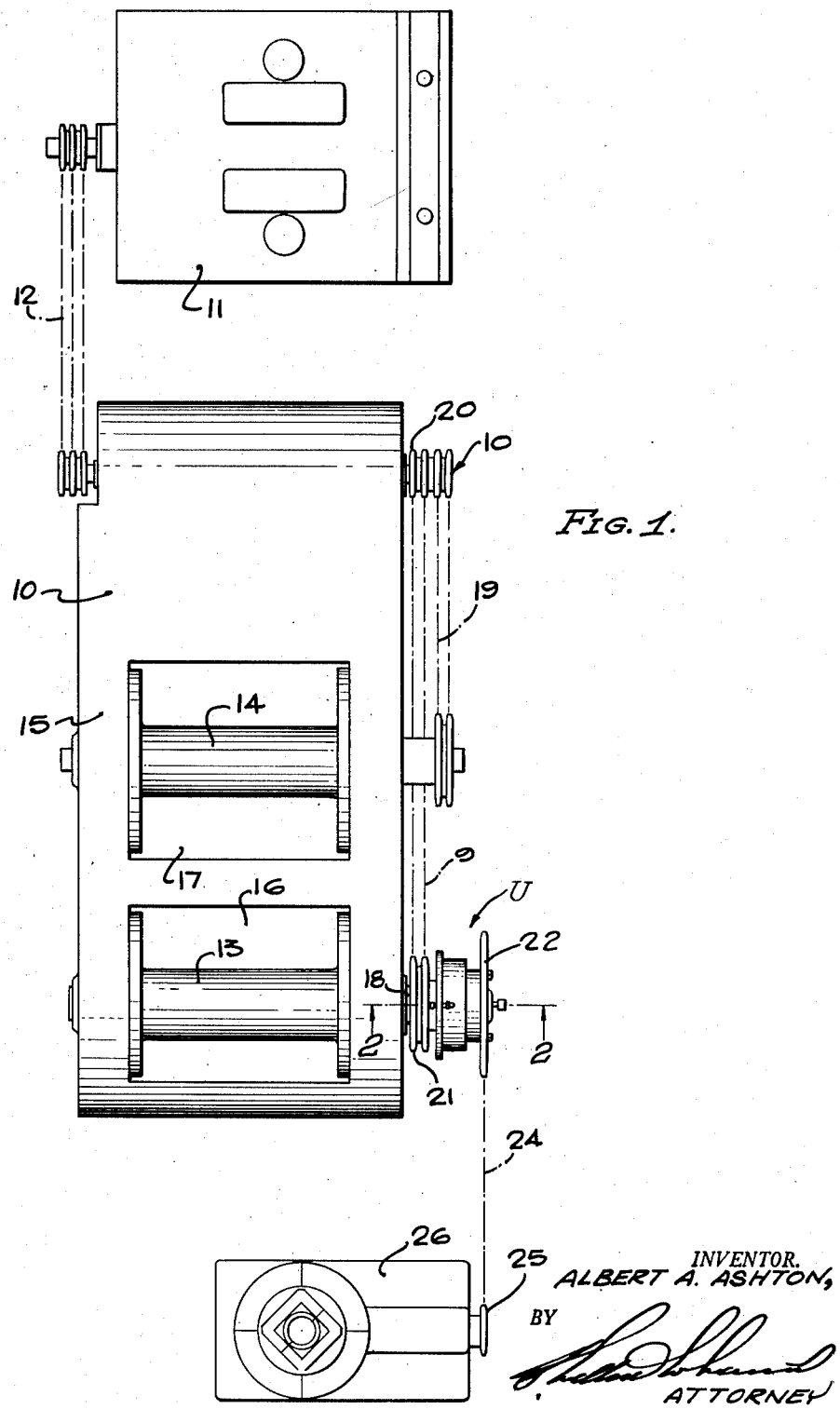
Fig. 1 is a plan view showing a drawworks, according to my invention, equipped with the rotary machine drive unit.

In Fig. 1, I show in a generally schematic manner a drawworks 10 arranged to be driven by an engine 11 through chain and sprocket drive means 12. The drawworks 10 has drums or spools 13 and 14 and is provided with a housing 15 having openings 16 and 17 therein through which the lines or cables may pass to the spools 13 and 14.

Concentrically of the front spool 13 there is a shaft 18 arranged to be driven by a dual chain 9, a drive sprocket 20 situated at the rear of the drawworks 10, and a driven sprocket 21 which is mounted on the rightwardly projecting end of the shaft 18 and caused to rotate therewith by key means 18'. A rotary drive unit U, forming part of my invention, is attached to the outer face portion of the sprocket 21 and is provided with a sprocket 22 arranged to drive a chain 24 which runs over a sprocket 25 of a rotary machine 26. The spool 14 is arranged to be driven from the sprocket 20 through a chain 19.

Figure 2:
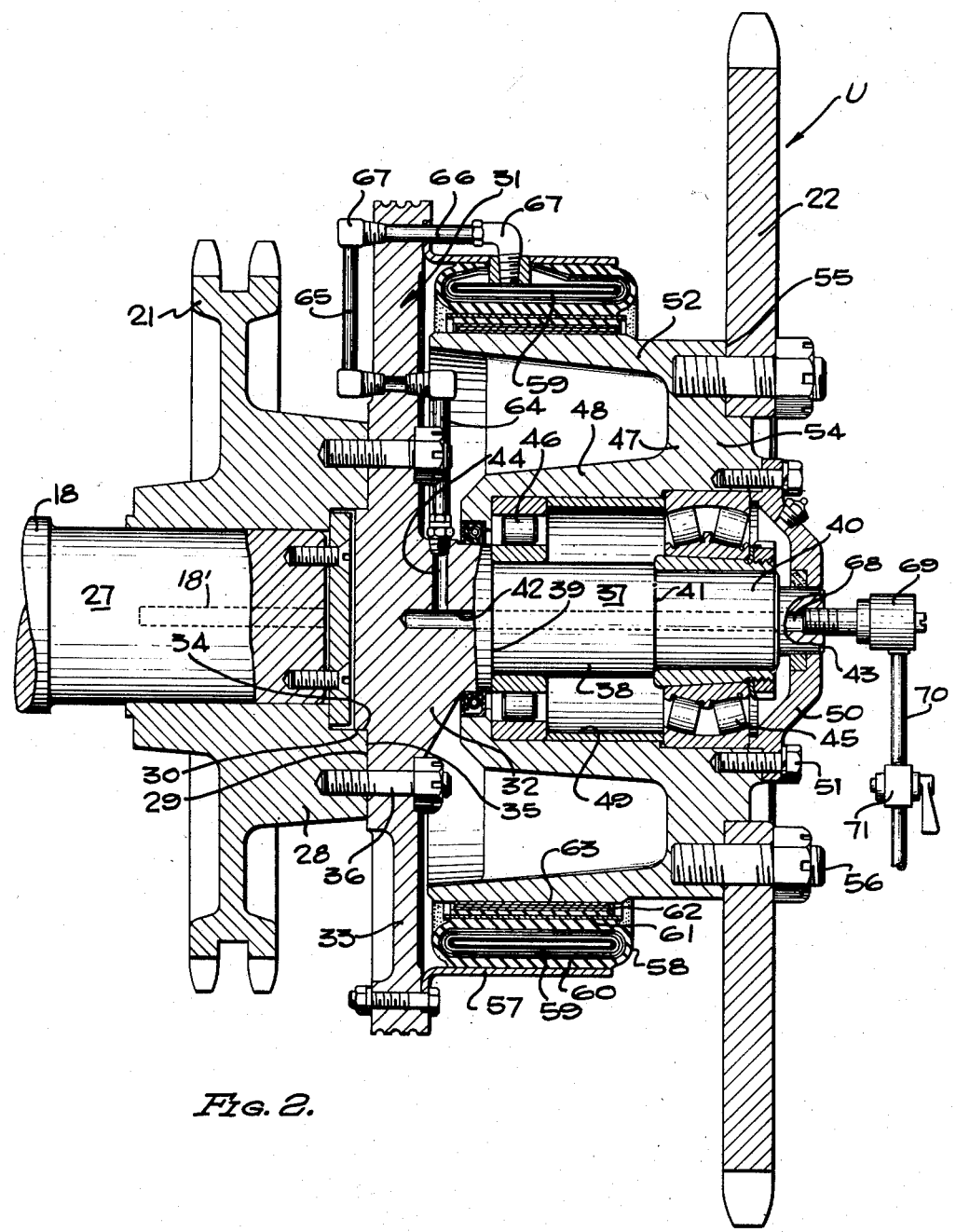
Fig. 2 is an enlarged fragmentary sectional view taken as indicated by the line 2—2 of Fig. 1, for showing the details of construction of the rotary machine drive unit and the preferred manner in which it is attached to a driven part of the drawworks.

As shown in Fig. 2, the shaft 18 of the drawworks 10 has a reduced end portion 27 which is arranged to receive the sprocket 21. The sprocket 21 is provided with a hub 28 which is diametrally enlarged on the outer portion of the sprocket 21 and this hub 28 is provided with a receptive face 29 perpendicular to the axis of rotation of the shaft 18 and having an annular shoulder 30 which is concentric to the axis of the shaft 18. The drive unit U is provided with a member 31 which I have referred to as a plate member for the reason that in the ordinary practice of the invention it need not have material thickness. The drive unit U includes the plate 31 and the hereinafter parts which are supported thereon.

The plate member 31 has a centrally located portion 32 and a radially extending portion 33. The central portion 32 of the plate 31 has centralizing shoulder means 34 for engaging the annular shoulder 29 of the hub 28, and has an annular shoulder 35 which bears against the face 29 of the hub 28 when the plate member 31 is bolted to the hub 28 by stud bolts 36. The central portion 32 of the plate 31 has an outwardly projecting stub shaft 37 which is aligned with the axis of the shaft 18 when the plate 31 is secured to the sprocket 21 as shown in Fig. 2. The stub shaft 37 is of stepped form. That is to say, it has an inner cylindrical portion 38 extending outwardly from an annular shoulder 39, and an outer cylindrical portion 40 of smaller diameter, there being a shoulder 41 between the cylindrical portions 38 and 40. Fluid passage means are provided by drilling an axial opening 42 inwardly from the outer reduced end portion 43 of the stub shaft 37. The inner end of this axial opening 42 communicates with a radial opening 44.

Bearing means, consisting of roller bearings 45 and 46 are mounted on the stub shaft in spaced relation as shown, and these bearings 45 and 46 support a drum 47 for relative rotation around the extended axis of the driven shaft 18 represented by the axis of the stub shaft 37. The drum 47 has an inner cylindrical wall 48 in which the bearings 45 and 46 are positioned and secured by a spacer sleeve 49 and a cover plate 50 which is secured in place by cap screws 51. In surrounding relation to the inner cylindrical wall there is an outer cylindrical wall 52 which is connected to the inner cylindrical wall by a radially extending annular wall 54 having an annular face 55 to which the inner portion of the rotary machine drive sprocket 22 is secured by stud bolts 56.

From the radially extended portion 33 of the plate 31 an annular wall 57 projects into a position surrounding a portion of the outer cylindrical wall 52 of the drum 47, and a fluid expansible friction clutch member 58 is disposed between the annular wall 57 and the outer cylindrical wall 52. Actuation of this friction clutch member 58 by the application of fluid pressure to its interior connects the plate 31 and the drum 42 for simultaneous rotation, so that when the friction clutch member 58 is actuated the sprocket 22 will be rotated and the rotary machine 26 will be driven.

The fluid expansible clutch member 58 is of annular form and comprises a tube 59 which appears flattened in cross section as shown in Fig. 2. The peripheral portion 60 of the tube 59 is secured to the inner face of the annular wall 57, and the inner annular portion 61 of the tube 59 is provided with friction means 62 adapted to be forced into frictional driving engagement with the surface 63 of the cylindrical wall 52 when fluid pressure is applied to the interior of the tube 59.

For the control of fluid pressure within the tube 59 of the fluid expansible friction clutch means 58, tubular members 64, 65 and 66, with suitable fittings 67, as shown, connect the radial passage 44 of the stub shaft 37 with the interior of the tube 59, and the outer end 68 of the passage 42 is connected by a swivel connector 69 with a duct 70 and a fluid pressure applying and releasing valve 71 with a source of fluid pressure, not shown.

When the clutch 58 is disengaged, by release of fluid pressure therefrom, the drum 47 and sprocket 22 remain stationary while the stub shaft 37 is permitted to rotate within the drum 47 when the shaft 18 is driven by power applied through the sprocket 21. When the driller desires to drive the rotary machine 26, he operates the valve 71 so as to apply fluid pressure to the interior of the tube 59 so that the friction means 62 thereof will be caused to make frictional driving engagement with the drum 52 whereby the sprocket 22 will be caused to rotate with the driven shaft 18. After the completion of well drilling operations, the rotary machine drive unit U will be again removed from its position at the outer end of the shaft 18 and placed in storage. The drawworks 10 may be then employed as hoisting equipment for well servicing. In the form of the invention shown, removal of the unit U requires that the bearings 45 and 46 and the parts supported thereby be removed from the stub shaft 37 to provide access to the nuts of the stud bolts 36 so that the plate 31 can be detached from the hub 28 which is a part of the drawworks 10.

I claim:

1. In a rotary machine drive unit adapted to be connected to a drawworks having a line spool for well servicing and having a driven shaft with a sprocket thereon, said sprocket having a hub portion with an outwardly directed receptive face and an annular shoulder: a plate adapted to be bolted to said hub against said face, said plate having a centralizing shoulder means to engage said shoulder; a stub plate projecting from said shaft in a position which is axial of said driven shaft when said plate is bolted to said sprocket, said stub shaft having a passage extending inwardly from the outer end thereof, the outer end of said passage being adapted to be connected to a source of fluid pressure; bearing means supported on said stub shaft; a drum member supported by said bearing means on said stub shaft for relative rotation around the extended axis of said driven shaft, said drum member comprising an inner cylindrical wall and an outer cylindrical wall surrounding said inner cylindrical wall and an annular radially disposed wall connecting like ends of said cylindrical walls; an annular wall projecting from said plate in a position to surround said outer cylindrical wall; an annular fluid expansion friction clutch member supported by said annular wall in a position surrounding said outer cylindrical wall, said clutch member having engaging means which makes frictional clutch engagement with said outer cylindrical wall when the clutch member is inflated by fluid pressure; a rotary machine drive sprocket fixed on said drum member; and means forming a duct connecting said passage to said expansible clutch member.

2. In a rotary machine drive unit adapted to be connected to a drawworks having a line spool for well servicing and having a driven shaft with a sprocket thereon, said sprocket having a hub portion with an outwardly directed receptive face and an annular shoulder: a plate adapted to be bolted to said hub against said face, said plate having a centralizing shoulder means to engage said shoulder; a stub shaft projecting from said plate in a position which is axial of said driven shaft when said plate is bolted to said sprocket, said stub shaft having a passage extending inwardly from the outer end thereof, the outer end of said passage being adapted to be connected to a source of fluid pressure; bearing means supported on said stub shaft; a drum member supported by said bearing means on said stub shaft for relative rotation around the extended axis of said driven shaft; an annular fluid expansion friction clutch means supported by said plate in a position surrounding said drum, said clutch means having engaging means which makes frictional clutch engagement with said drum when the clutch means is inflated by fluid pressure; a rotary machine drive sprocket fixed on said drum member; and means forming a duct connecting said passage to said expansible clutch means.

3. In a rotary machine drive unit adapted to be connected to a drawworks having a line spool for well servicing and having a driven shaft with a sprocket thereon, said sprocket having a hub portion with an outwardly directed receptive face and an annular shoulder: a plate adapted to be bolted to said hub against said face, said plate having a centralizing shoulder means to engage said shoulder; a stub shaft projecting from said plate in a position which is axial of said driven shaft when said plate is bolted to said sprocket; bearing means supported on said stub shaft; a drum member supported by said bearing means on said stub shaft for relative rotation around the extended axis of said driven shaft, said drum member comprising an inner cylindrical wall and an outer cylindrical wall surrounding said inner cylindrical wall and an annular radially disposed wall connecting like ends of said cylindrical walls; an annular wall projecting from said plate in a position to surround said outer cylindrical wall; an annular fluid expansible friction clutch member supported between said annular wall and said cylindrical wall of said drum so that expansion of said clutch member will effect a driving connection of said plate and said drum; a rotary machine drive sprocket fixed on said drum; and means for connecting said fluid expansible friction clutch member to a source of fluid pressure.

4. In a rotary machine drive unit adapted to be connected to a drawworks having a line spool for well servicing and having a driven shaft and a sprocket on the end of said shaft: a plate adapted to be bolted to the outer face of said sprocket; a stub shaft projecting from said plate in a position which is axial of said driven shaft when said plate is bolted to said sprocket; bearing means supported on said stub shaft; a drum member supported by said bearing means on said stub shaft for relative rotation around the extended axis of said driven shaft; an annular fluid expansible friction clutch means supported between said plate and said drum so that expansion of said clutch means will effect a driving connection of said plate and said drum; a rotary machine drive sprocket fixed on said drum; and means for connecting said fluid expansible friction clutch means to a source of fluid pressure.

5. In a rotary machine drive unit adapted to be connected to a drawworks having a line spool for well servicing and having a driven shaft and a sprocket on the end of said shaft: a plate adapted to be bolted to the outer face of said sprocket; a stub shaft projecting from said plate in a position which is axial of said driven shaft when said plate is bolted to said sprocket, said stub shaft having a passage extending inwardly from the outer end thereof, the outer end of said passage being adapted to be connected to a source of fluid pressure; bearing means supported on said stub shaft; a drum member supported by said bearing means on said stub shaft for relative rotation around the extended axis of said driven shaft; an annular fluid expansion friction clutch means supported between said plate in a position surrounding said drum, said clutch member having engaging means which makes frictional clutch engagement with said drum when the cluch means is inflated by fluid pressure; a rotary machine drive sprocket fixed on said drum member; and means forming a duct connecting said passage to said expansible clutch means.

6. In a well servicing machine and removable rotary machine drive: a drawworks device having a drum, a drum shaft supporting said drum and projecting therefrom, a sprocket on the projecting end of said shaft, and a hub projecting outwardly with relation to said sprocket and aligned with said shaft, said hub having an outwardly directed receptive face and an annular shoulder; and a rotary machine drive comprising a plate adapted to be bolted to said hub against said face, said plate having a centralizing shoulder means to engage said shoulder, a stub shaft projecting from said plate in a position which is axial of said driven shaft when said plate is bolted to said hub, said stub shaft having a passage extending inwardly from the outer end thereof, the outer end of said passage being adapted to be connected to a source of fluid pressure, bearing means supported on said stub shaft, a drum member supported by said bearing means on said stub shaft for relative rotation around the extended axis of said driven shaft, said drum member comprising an inner cylindrical wall and an outer cylindrical wall surrounding said inner cylindrical wall and an annular radially disposed wall connecting said cylindrical walls, an annular wall projecting from said plate in a position to surround said outer cylindrical wall, an annular fluid expanded friction clutch member supported by said annular wall in a position surrounding said outer cylindrical wall, said clutch member having engaging means which makes frictional clutch engagement with said outer cylindrical wall when the clutch member is inflated by fluid pressure, and a rotary machine drive sprocket fixed on said drum member.

7. In a well servicing machine and removable rotary machine drive: a drawworks device having a drum, a drum shaft supporting said drum and projecting from an end thereof, and a sprocket on the projecting end of said shaft; and a removable rotary machine drive comprising a plate adapted to be bolted to said sprocket in a position surrounding the axis of said shaft and adjacent the outer radial face of said sprocket, a stub shaft projecting from said plate in a position which is axial of said driven shaft when said plate is bolted to said hub, said stub shaft having a passage extending inwardly from the outer end thereof, the outer end of said passage being adapted to be connected to a source of fluid pressure, bearing means supported on said stub shaft, a drum member supported by said bearing means on said stub shaft for relative rotation around the extended axis of said driven shaft, said drum member comprising an inner cylindrical wall and an outer cylindrical wall surrounding said inner cylindrical wall and an annular radially disposed wall connecting said cylinder walls, an annular wall projecting from said plate in a position to surround said outer cylindrical wall, an annular fluid expanded friction clutch member supported by said annular wall in a position surrounding said outer cylindrical wall, said clutch member having engaging means which makes frictional clutch engagement with said outer cylindrical wall when the clutch member is inflated by fluid pressure, and a rotary machine drive sprocket fixed on said drum member.

8. In a well servicing machine and removable rotary machine drive: a drawworks device having a drum, a drum shaft supporting said drum and projecting therefrom, a sprocket on the projecting end of said shaft, and a hub projecting outwardly with relation to said sprocket and aligned with said shaft, said hub having an outwardly directed receptive face and an annular shoulder; and a rotary machine drive comprising a plate adapted to be bolted to said hub against said face, said plate having a centralizing shoulder means to engage said shoulder, a stub shaft projecting from said plate in a position which is axial of said driven shaft when said plate is bolted to said hub, said stub shaft having a passage extending inwardly from the outer end thereof, the outer end of said passage being adapted to be connected to a source of fluid pressure, bearing means supported on said stub shaft, a drum member supported by said bearing means on said stub shaft for relative rotation around the extended axis of said driven shaft, and annular fluid expansible friction clutch means supported between said plate and said drum so that expansion of said clutch member will effect a driving connection of said plate and said drum, a rotary machine drive sprocket fixed on said drum, and means for connecting said fluid expansible friction clutch means to a source of fluid pressure.

9. In a well servicing machine and removable rotary machine drive: a drawworks device having a drum, a drum shaft supporting said drum and projecting from an end thereof, and a sprocket on the projecting end of said shaft; and a removable rotary machine drive comprising a plate adapted to be bolted to said sprocket in a position surrounding the axis of said shaft and adjacent the outer radial face of said sprocket, a stub shaft projecting from said plate in a position which is axial of said driven shaft when said plate is bolted to said hub, said stub shaft having a passage extending inwardly from the outer end thereof, the outer end of said passage being adapted to be connected to a source of fluid pressure, bearing means supported on said stub shaft, a rotary machine drive sprocket member supported by said bearing means on said stub shaft for rotation around the axis of said driven shaft, expansible friction clutch means arranged between said plate and said sprocket member so that expansion of said clutch means will effect driving connection of said plate and said sprocket member, and means for connecting said fluid expansible clutch means to a source of fluid pressure.

References Cited in the file of this patent

UNITED STATES PATENTS

| | | |
|---|---|---|
| 2,354,174 | Schmitter | July 18, 1944 |
| 2,565,791 | Wagner | Aug. 28, 1951 |
| 2,620,909 | Moon | Dec. 9, 1952 |
| 2,650,064 | Picard | Aug. 25, 1953 |